Patented Jan. 9, 1923.

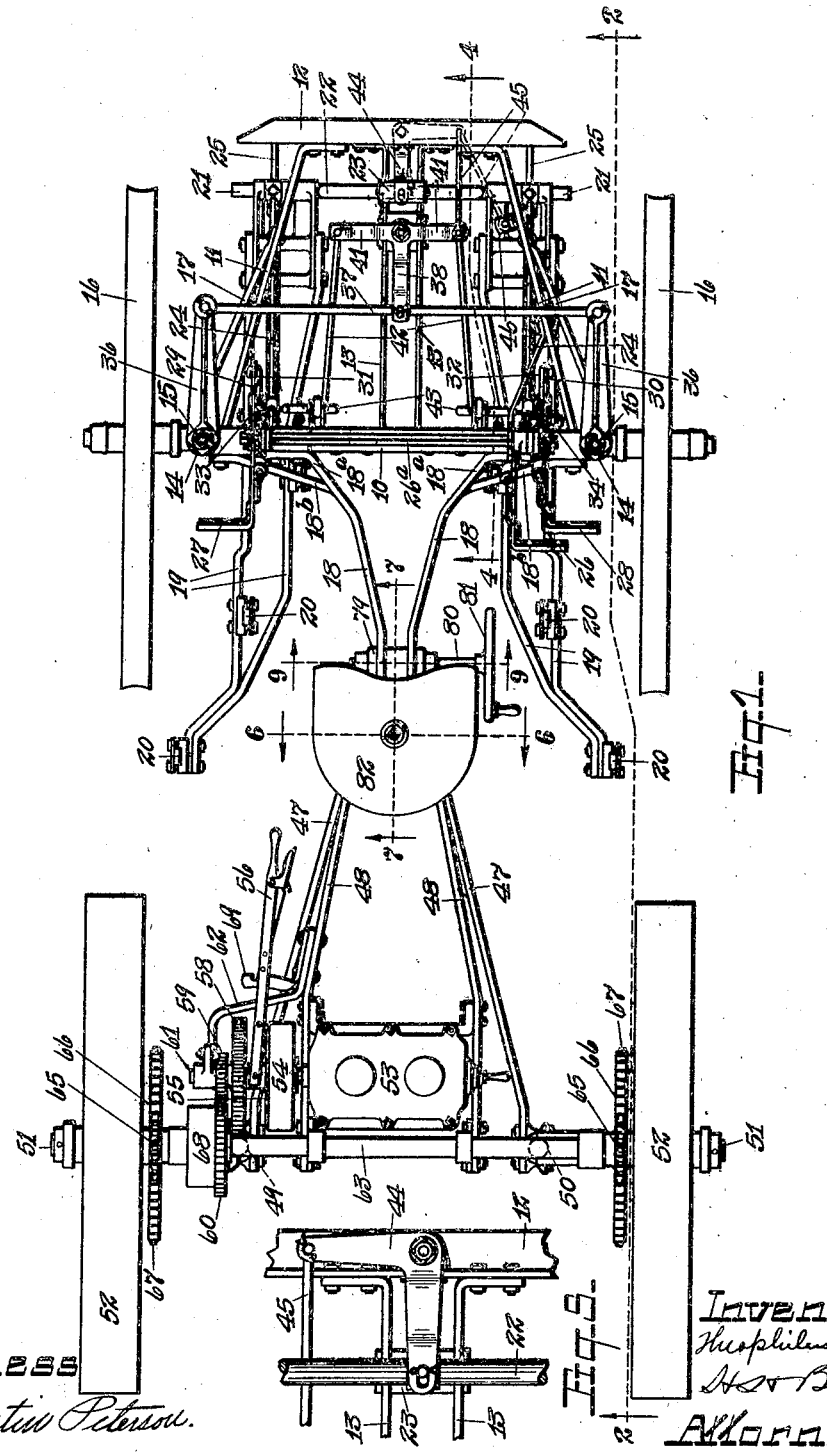

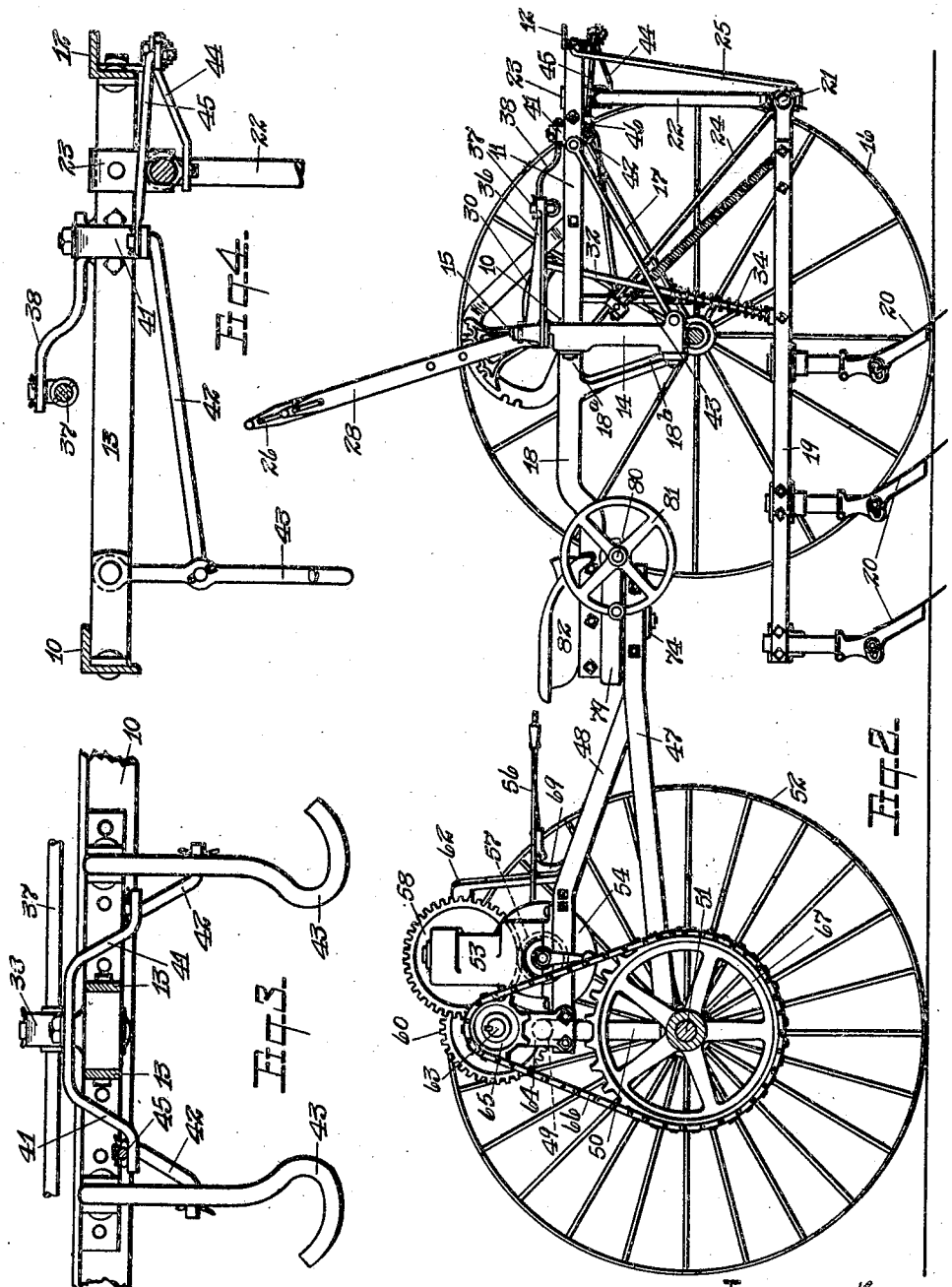

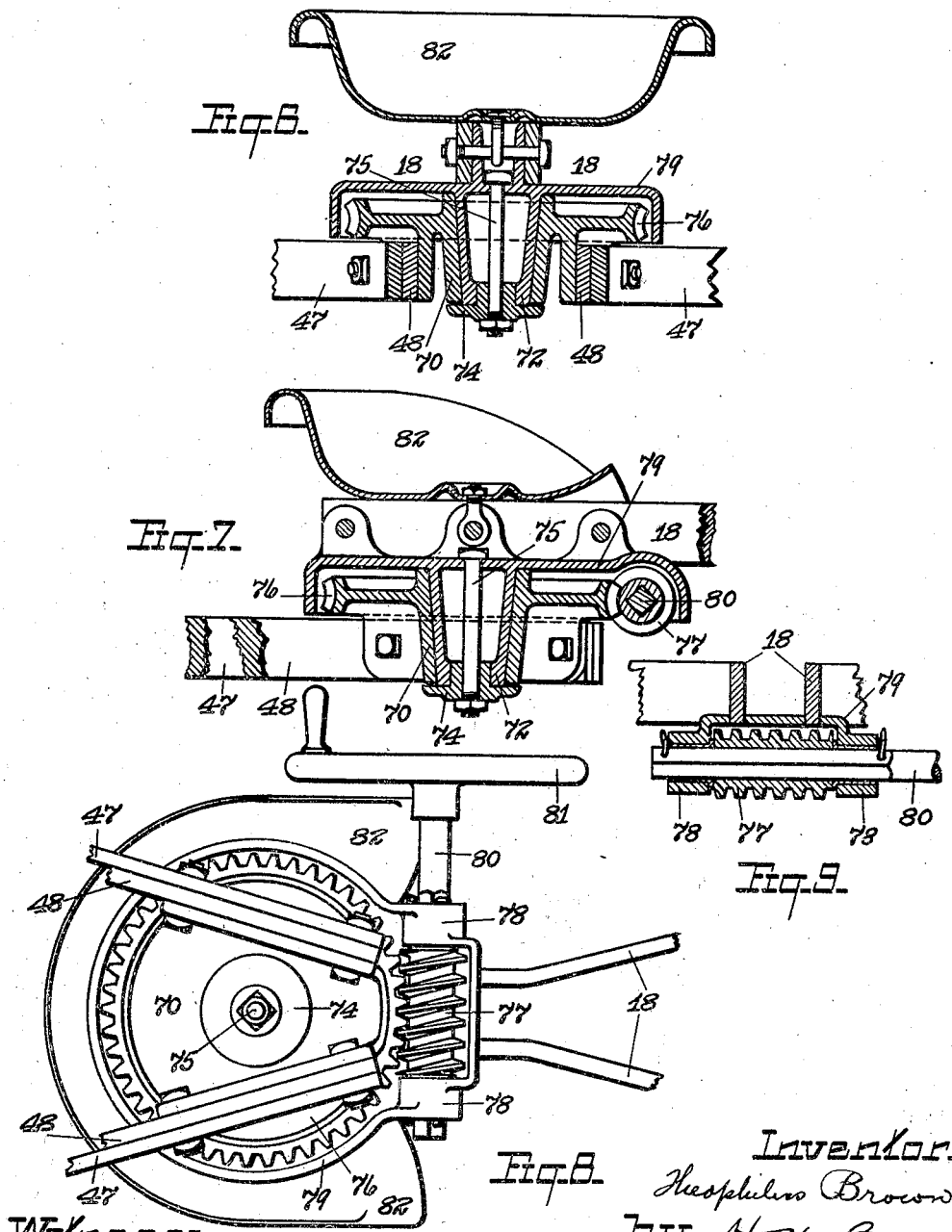

1,441,480

UNITED STATES PATENT OFFICE.

THEOPHILUS BROWN, OF MOLINE, ILLINOIS, ASSIGNOR TO DEERE AND COMPANY, OF MOLINE, ILLINOIS, A CORPORATION OF ILLINOIS.

TRACTOR.

Application filed July 10, 1916, Serial No. 108,500. Renewed March 31, 1922. Serial No. 548,521.

*To all whom it may concern:*

Be it known that I, THEOPHILUS BROWN, a citizen of the United States, residing at Moline, in the county of Rock Island and State of Illinois, have invented certain new and useful Improvements in Tractors, of which the following is a specification, reference being had therein to the accompanying drawing.

This invention relates to improvements in tractors; especially those of the sort that are used for propelling earth-working tools; and still more particularly, those that are used for propelling implements which, at frequently occurring intervals, must be sharply turned, bodily, from one direction of travel to another, and which also, at still shorter intervals, require frequent deflections from a given line of advance, as for example, when following the lines of rows of irregularly positioned plants.

There are many forms of tractor apparatus within the class of those herein contemplated, each of which, for various reasons, must be made relatively long. This increases the difficulty incident to turning the front end to the left or to the right by means of the steering wheels, of one sort or another, with which they are equipped. They can be deflected, to a limited extent, from a given line of travel in either direction with these wheels, but it is frequently necessary to carry the structure, as an entirety, away from such lines on curves of short radii, this being made necessary because of the restricted space within which this turning, bodily, must be effected.

One of the objects of the present invention is to construct a tractor apparatus in such way that, when occasion demands, it can be turned on such short radial curves. Another is to provide it with two turning or steering mechanisms, by one of which it can thus be sharply turned, bodily, and the other of which can be utilized to quickly and delicately deflect one end, preferably the front end, of the vehicle for a short distance, and on curves of long radii.

For the purpose of illustration, I have selected an implement of the class of those used for cultivating corn; an apparatus for that purpose furnishing an excellent example of the advantages of my improvements when embodied in working form. And, below, I shall describe a tractor implement of this class somewhat in detail; but it will be understood that such selection is made, and such details of description given, merely for the purpose of conveying a full understanding of the invention. It can be embodied in any of many other forms of apparatus, as concerns the details.

Of the drawings—

Fig. 1 is a plan view of a tractor mechanism embodying my improvements;

Fig. 2 is a view, partly in side elevation, partly in section, on line 2—2, Figure 1.

Fig. 3 is a view, partly in front elevation, partly in section, of the treadles and treadle levers for controlling the dirigible wheels;

Fig. 4 is a view, partly in side elevation, of parts shown in Figure 5, and partly in section, on line 4—4, Fig. 1;

Fig. 5 is a bottom plan view of the devices for shifting the tool gangs laterally;

Fig. 6 is a vertical transverse section on line 6—6, Fig. 1;

Fig. 7 is a vertical longitudinal section on the line 7—7, Fig. 1;

Fig. 8 is a bottom view, on a larger scale, of the joining devices for the frame sections and of the means for adjusting them; and Fig. 9 is a section on line 9—9, Fig. 1.

The framework of the machine, considered as an entirety, may be regarded as made up of two principal frame sections, one for supporting the wheels and other parts at the front, and the other for supporting the wheels and adjacent parts at the rear.

In the mechanism shown the front frame section and the parts attached may be considered as the operative element, in the illustration given the cultivating element of the apparatus, while the rear section and the parts attached may be regarded as the traction element. The front element comprises the following parts. There is a main cross frame member 10 from which extend forward the supports 11, 11, connected at their front ends by a frame member 12. 13, 13 are brace bars near the central longitudinal lines connecting the parts 10 and 12. 14, 14 are vertically arranged tubular brackets or sockets respectively secured to the ends of the cross frame member 10. In these are mounted the stems 15 which carry, or are formed integrally with, the spindles of the front ground wheels 16. 17, 17 are braces extending respectively from the lower ends of the sockets 14 to the brace supports 11.

18, 18 are frame bars that extend rearward from the cross element 10, and by which the front element of the apparatus is connected to the rear element, as will be described. Each bar 18 has, at its front end, a vertical fork with arms 18$^a$, 18$^b$, the former rigidly secured to the cross bar 10, and the latter to the lower portions of the sockets 14, respectively.

In the drawings are shown gangs of earth-working tools, each having one or more drag bars or beams 19 and shovels or earth implements 20. 22 is an arch bar with vertical arms and outwardly turned spindles 21, this arch being held firmly in vertical planes by the bracket 23, secured to the bars 13, and by the inclined braces 24, 25, one extending backward to the central parts of the central frame, and the other extending forward to the cross bar 12. The arch, however, can be arranged to slide transversely of the apparatus, the upper part of it being slidably mounted in the bracket 23. 26 is a master lever supported by a rock shaft 26$^a$, by which lever the positions of all the drag bars or beams and tools can be regulated in unison. 27 and 28 are sub-levers mounted upon the shaft 26$^a$ of the master lever. 29 is an arm extending forward from the lever 27, and 30 an arm extending from lever 28. These are connected to the tool gangs by links 31 and 32. The links, respectively, have compression springs 33 and 34 which permit the tool gangs to yield vertically as required.

By the levers 27 and 28 either of the tool gangs can be adjusted independently of the other; by the master lever 26 all the gangs are adjustable together.

The stems 15, 15 of the wheel spindles have, at their upper ends, forward projecting arms 36 connected by a link 37. 38 is a three-arm bell crank lever. The arm 38 of the lever is pivotally connected to the link 37 and the laterally projecting arms 41 are connected by links 42 to foot levers 43 which, in turn, are pivoted to brackets on the frame element 10.

By actuating the foot levers 43 motion is transmitted through links 42 to the arms 41 of the bell crank lever, and arm 38 of the latter, through its connection with the cross link 37, simultaneously vibrates the crank arms 36 and the stems 25, which results in turning the wheels to the left or the right, and causes the front end of the machine to be correspondingly deflected, more or less. With an apparatus such as shown, when used in cultivating a row of plants, this turning at the front end of the machine brings the one or the other of the tool gangs closer to the row. Sometimes it is desirable to shift the tool gangs more rapidly toward or from the plants than can be accomplished if the deflecting of the front end of the machine, as just described, is only depended upon. To permit this, the tool gangs are attached in the way just described, that is to say, so that they can be moved laterally on, and independently of, the frame, and are provided with devices by which they can be shifted thus independently at the same time that the front end of the machine is being turned by the steering wheel. The total lateral movement of the gangs is thus increased during a given period of time.

To accomplish this, use is made of a bell crank 44 mounted on the cross bar 12, one arm of which is connected to the aforesaid bell crank lever 38 by a link 45, and the other arm of which is pivotally connected to the arch 22. When the foot levers are actuated, and the wheels 16 are turned, through the transverse movements of the cross link rod 37 and the bell lever 38, the arch and the tool gangs are simultaneously moved in unison with the movements of the wheels.

If the conditions of the work are such that such lateral shifting, bodily, of the tool gangs is not required, and the steering resulting from turning the wheels 16 is sufficient, the gang shifting devices can be thrown out of action by disconnecting the link 45. And to prevent accidental shifting movements of the gangs after such disconnection, the link 45 can be used as a lock, as one end of it can be fastened in any suitable holder, such as that, at 46, carried by one of the frame bars.

The second main element of the apparatus, at the rear, comprises the following parts. 47, 47 are bars diverging outward and rearward and inclined somewhat downward. 48, 48 are bars that similarly diverge rearward, but extend upward toward the rear. The front end parts of these bars 47 and 48 are joined rigidly together, as shown in Figure 8, and are also joined to the devices which connect the front frame section to the rear frame section. The rear frame includes an arched axle bar 49 which is carried high enough to pass over the plants which can be passed by the forward arch 22. The vertical parts of the rear arch are indicated by 50, and at their lower ends, these are connected to, or formed integrally with, spindles 51, upon which are mounted the traction ground wheels 52. The rear ends of the lower bars 47 of the rear frame section are rigidly secured to the vertical parts 50 of the axle; the upwadly extending bars 48 are rigidly secured by suitable brackets to the upper part of the arch, these parts 47, 48 and 49 constituting the main elements of the rear frame section.

53 is a motor suitably suported. Preferably it is placed upon the rear parts of the top bars 48. The motor shaft has a flywheel carrying, or formed as one element of, the friction clutch at 54. The companion element 55 of the clutch is controlled by the hand lever 56 which is locked in any position desired by a thumb latch, detent, and notched segment 69.

57 is a pinion on the axis of the motor shaft and actuated thereby when the clutch is closed. This pinion meshes with a gear 58 on a shaft above the motor shaft, the wheel 58 or shaft above the motor shaft, the wheel 58 or shaft carrying a pinion 59 which meshes with the gear 60 on the cross shaft 63 mounted in bearings 64 secured to the upper part of the arched axle 49. The countershaft 61, and the wheels thereon, are supported by bracket 62 rigidly connected to one of the frame bars 48.

65, 65 are sprocket wheels connected by chain 66 with sprocket wheels 67 on the traction wheels 52.

68 is a compensating or differential gear of any well known or suitable sort interposed between the pinion 59 and the sprocket wheels 65. As shown, this compensating gear is on the shaft 63 and is composed of suitable elements by which the power transmitted to the gear 60 will be imparted equally to the traction wheels, but with differential speeds, according to circumstances.

The forward ends of the longitudinal bars 47 and 48 of the rear frame section, as above stated, are connected with the rear ends of the bars 18 of the front frame section, as follows:

70 indicates a tubular, preferably conical, socket which is secured to the forward end of the bars 47, 48, see Figures 6, 7 and 8. 76 is a worm gear integral with, or secured to, this socket 70. 72 is a stub shaft or large stem fitting in the socket 70, this shaft or stem being rigid with the bars 18 and the front frame section. As shown, it is cast with a plate 79 which has upwardly projecting ears for bolting it to said bars 18. Plate 79 can be formed, as shown, with the downwardly depending flange to provide a protecting cover for the worm gear. The shaft or stem 72 is held snugly in journaling position in the socket 70 by means of the bolt 75, the head of which engages with the plate 79 and the bolt having a nut at the lower end engaging with a washer cap 74 of sufficient width to engage with the lower end of the socket 70. 77 is a worm on a horizontal shaft 80 mounted in bearings 78 which are shown as formed in the plate cover, or housing 79. This worm being mounted on the front frame section, and the worm gear 76 on the rear section, and the two sections hinged together or pivotally connected, it will be seen that the front frame section and the rear section can be readily and quickly thrown to one or another of several inclinations, as desired. To effect this, the worm is turned by means of a hand wheel 81 secured to the worm shaft 80, the wheel preferably having an eccentric handle convenient for grasping.

The operator is provided with a seat 82 adjacent to the hinge axis and to the hand wheel 81.

The mode of operating or manipulating an apparatus such as has been above described will be readily understood. Assume that it is being used for cultivating plants growing in rows: The motor is first started and the operator, if in his seat 82, can start or stop the movement of the machine by the lever 56 and the friction clutch.

As the machine moves forward, the operator has complete control of its direction. If the path along which he should advance is approximately straight, and deviates only slightly from a straight line at intervals, he causes the implement to deflect from such line, to follow the slight variations in the path, by means of his foot levers 43.

If, however, there is considerable irregularity, or if the necessary deflections of the path from a straight line are wide, and he finds it necessary to throw the tools, during short periods of time, over relatively long distances, he connects the tool-shifting devices with the front steering mechanism by means of the link 45; and then the act of guiding the tools toward the plants simultaneously turns the front wheels and deflects the front end of the machine.

In either case, he automatically leads the rear ground wheels or traction devices in the direction to be traveled.

When it becomes necessary to turn the machine completely around, as, for instance, when the end of a row of plants has been reached, and to travel in the opposite direction, the operator inclines the front frame section to the rear section by turning the hand wheel 81 in the proper direction, this causing the worm 77 and the worm gear 76 to bring the frame sections to an angle with each other toward the left or right, as demanded. It causes the axes of the wheels under the front section to assume a position inclined to the axes of the wheels for the rear section. And by angulating the lines of the two frame sections to a considerable extent, he can turn the implement on curves of short radii.

The extent to which he can, by the steering treadles, angulate the front wheels is limited; but if he supplements this by the angulating of the frame sections, made possible by the hinging and by the power devices at 76 and 77, he can shorten the radii of the curves on which the front end of the mechanism turns.

With the two steering mechanisms combined the difficulties arising from having a long machine are largely obviated.

When the machine has been brought around toward the position for traveling in the opposite direction, the hand wheel and worm are reversed, and the front and rear frame sections are again brought into alignment, and their parts are ready again to be steered and manipulated through the foot levers.

As already stated, I have presented, somewhat in detail, a mechanism in this particular sub-class as one exhibiting all the advantages incident to my invention. But as concerns the particular work to be accomplished, or the details of structure, there can be modification in the mechanism without departing from the essential features of the invention.

What I claim is:

1. In a tractor, the combination of one or more front ground wheels, one or more rear ground wheels, a frame for supporting said ground wheels, a motor on the frame for transmitting power to one or more of the ground wheels, and two sets of steering devices, those of one set being adapted to adjust the front ground wheels to lines of advance inclined to the longitudinal lines of the machine, substantially as set forth, whereby the tractor is caused to turn laterally on curves of relatively long radii, and the steering devices of the other set being arranged, substantially as set forth, to move both of the front wheels simultaneously and bodily, in the same direction, relatively to the rear wheels, and cause the tractor to advance in said direction on curves of relatively shorter radii.

2. In a tractor, the combination of one or more front ground wheels, one or more rear ground wheels, a frame for supporting said wheels, a motor for transmitting power to one or more ground wheels, and two sets of steering devices, the devices of one set being adapted to cause the turning of the front wheels, substantially as set forth, and cause the tractor to turn bodily on curves of long radii, and the steering devices of the other set being arranged to throw both of the front wheels simultaneously and bodily, in the same direction, relatively to the ground wheels, while said front wheels are traveling in parallelism on curves of shorter radii, and to relatively move the rear wheels to cause them to travel in the opposite direction.

3. In a tractor, the combination of one or more front ground wheels, one or more rear ground wheels, a frame for supporting said ground wheels and jointed on a vertical steering pivot at a point between the front and rear wheel axles, said parts being adapted to have the ground wheel or wheels at the rear positioned relatively to the ground wheel or wheels at the front to cause the tractor to turn laterally, a motor on the frame arranged to transmit power to one or more of said ground wheels, and a set of steering devices supplemental to the devices aforesaid for causing the lateral turning of the tractor.

4. In a tractor, the combination of one or more front ground wheels, one or more rear ground wheels, a frame for supporting said ground wheels and jointed on a vertical steering pivot at a point between the front and rear wheel axles, a motor on the frame adapted to transmit tractive power to one or more of the said ground wheels, and two sets of devices each adapted to vary the inclination of the axes of the ground wheel or wheels at the front to the axes of the ground wheel or wheels at the rear to cause the lateral turning of the tractor.

5. In a tractor, the combination of one or more front ground wheels, one or more rear ground wheels, a frame for supporting said ground wheels and jointed on a vertical steering pivot at a point between the front and rear wheel axles, a motor on the frame for transmitting tractive power to one or more of said ground wheels, and two sets of steering devices each adapted to cause the turning of the tractor laterally in either direction independently of the other.

6. In a tractor, the combination of one or more front ground wheels, one or more rear ground wheels, a frame for supporting the ground wheels and jointed on a vertical steering pivot at a point between the front and rear wheel axles, a motor on the frame for transmitting tractive force to one or more of the ground wheels, steering devices in fixed relation to the ground wheel or wheels at the front for causing the lateral turning of the tractor, and arranged to be positioned bodily in different working angular relations to the ground wheel or wheels at the rear.

7. In a tractor, the combination of one or more front ground wheels, one or more rear ground wheels, a frame for supporting the ground wheels and jointed on a vertical steering pivot at a point between the front and rear wheel axles, a motor on the frame for transmitting tractive power to one or more of the ground wheels, a set of steering devices held bodily in fixed position relative to the ground wheel or wheels at the front, and means supporting the said steering devices and adapted to be positioned adjustably in relation to the ground wheel or wheels at the rear in order to change by such adjustment the line of travel of the tractor.

8. In a tractor, the combination of one or more ground wheels, one or more rear ground wheels, a frame for supporting said ground wheels and jointed on a vertical steering pivot at a point between the front and rear wheel axles, a motor on the frame for transmitting tractive power to one or more of the ground wheels, a set of steering devices for causing the tractor to turn laterally, and means for adjusting said steering devices bodily relatively to the ground wheel or wheels at the rear to increase or decrease the radii of the curves along which the tractor turns.

9. In a tractor, the combination of the two wheel-supporting frame sections, one in the rear of the other and jointed on a vertical steering pivot at a point between the front and rear wheel axles and relatively adjustable laterally to different inclinations to each other, a ground wheel or wheels on each of said frame sections, a motor supported by said frame and arranged to transmit tractive power to one or more of said ground wheels, and steering devices for turning the tractor supplemental to said adjustable frame sections.

10. In a tractor, the combination of a front frame section, a ground wheel supported thereby, a rear frame section, a ground wheel supported thereby, said frame sections being connected together by a central vertical steering pivot and adjustable laterally relatively to each other to vary the inclinations of the axes of the ground wheels respectively supported thereby, the adjustments thereof being adapted to cause the tractor to turn laterally, and supplemental steering devices also for swinging a set of the ground wheels relative to their frame section causing its lateral turning.

11. In a tractor, the combination of a rear frame section, one or more ground wheels supported thereby, a front frame section, one or more ground wheels supported thereby, said frame sections being jointed together on a vertical steering pivot and laterally adjustable relatively to each other to vary bodily the working positions of the ground wheels supported thereby respectively, means for swinging a set of the ground wheels relative to their frame section, and the motor supported by said frame sections and arranged to transmit tractive power to one or more of the ground wheels.

12. In a tractor, the combination of a front frame section, one or more ground wheels supported thereby, a rear frame section, one or more ground wheels supported thereby, the frame sections being connected by a central vertical steering pivot to permit their being laterally adjusted relatively to each other to different angles of inclination, means supported on the frame sections for applying power to effect such adjustment of the frame sections, means for swinging a set of the ground wheels relative to their frame section, and the motor supported by said frame sections and arranged to transmit tractive power to one or more of the ground wheels.

In testimony whereof, I affix my signature, in presence of two witnesses.

THEOPHILUS BROWN.

Witnesses:
JESSIE SIMSER,
W. G. DUFFIELD.